United States Patent [19]

Jeanvoine et al.

[11] 4,330,630

[45] May 18, 1982

[54] FUSED CAST REFRACTORY COMPOSITIONS AND GLASS MELTING FURNACES INCORPORATING THEM

[75] Inventors: Pierre L. Jeanvoine, Morieres les Avignon; Maurice Gardiol, Avignon, both of France

[73] Assignee: Societe Europeenne des Produits Refractaires, Neuilly-sur-Seine, France

[21] Appl. No.: 238,975

[22] Filed: Feb. 27, 1981

[30] Foreign Application Priority Data

Mar. 14, 1980 [FR] France .................................. 80 05777

[51] Int. Cl.³ ............................................. C04B 35/48
[52] U.S. Cl. ...................................... 501/105; 501/107
[58] Field of Search ................. 501/104, 105, 107, 132

[56] References Cited

U.S. PATENT DOCUMENTS 2,297,546  9/1942  Field .................................. 501/105

3,837,870  9/1974  Recasens et al. ................... 501/104

*Primary Examiner*—James Poer
*Attorney, Agent, or Firm*—Watson, Cole, Grindle & Watson

[57] ABSTRACT

A fused cast refractory composition which is suitable for use as the lining of a glass melting furnace comprises, by weight and on an oxide basis:

1 to 74% of $CrO_3$,
15 to 40% of $ZrO_2$,
3 to 76% of $Al_2O_3$
7.5 to 20% of $SiO_2$,
0.4 to 2.5% of $Na_2O$, and
0.3 to 4.0% of iron oxide and/or manganese oxide, the $SiO_2/Na_2O$ ratio being from 5 to 15, and the $Na_2O$ being optionally partially or wholly replaceable by a technically equivalent amount of one or more other alkali metal oxides, and the sum of the specified ingredients being at least 97% of the total composition.

5 Claims, No Drawings

FUSED CAST REFRACTORY COMPOSITIONS AND GLASS MELTING FURNACES INCORPORATING THEM

BACKGROUND OF THE INVENTION

1. Field of the Invention

This invention is concerned with fused cast refractory compositions, that is, compositions which are formed into shaped refractory bodies by casting from a melt, and with glass melting furnaces which are at least partially lined with such cast refractory compositions.

2. The Prior Art

French Pat. No. 2,183,604 and U.S. Pat. No. 3,837,870 describe fused cast refractory compositions which are useful for the construction of glass melting furnaces and which comprise crystalline phases based on chromium oxide, zirconia and, optionally, alumina, and a vitreous phase formed of silica and $Na_2O$ and substantially saturated with alumina, and of which the composition, by weight and on an oxide basis, is as follows:

1 to 74% of $Cr_2O_3$,
15 to 40% of $ZrO_2$,
3 to 76% of $Al_2O_3$,
7.5 to 20% of $SiO_2$, and
0.4 to 2.5% of $Na_2O$, the $SiO_2/Na_2O$ ratio being from 8 to 18 and the $Na_2O$ being optionally partially or wholly replaceable by a technically equivalent amount of at least one metal oxide chosen from $K_2O$, $Li_2O$, $CaO$, $BaO$, $BeO$ and $MgO$. A refractory composition of this type having the following composition, by weight and on an oxide basis:

28% of $Cr_2O_3$,
28% of $ZrO_2$,
28.3% of $Al_2O_3$,
14.5% of $SiO_2$,
1.1% of $Na_2O$, and
0.01% of $TiO_2+Fe_2O_3$, is manufactured and sold by Societe Europeenne des Produits Refractaires under the trade name "ER.2161".

These refractory compositions, in particular the ER.2161 noted above, were originally intended for general use at the weak points of furnaces used for the manufacture of glass, but they proved to be inadequate when used for the walls of furnaces used for the manufacture of soda-lime glass by exhibiting greater wear, in the long term, than that which had been expected from the laboratory results. For this reason, these refractory compositions have been used largely only for the construction of furnaces used for the manufacture of borosilicate glass and in the necks of furnaces used for producing soda-lime glass. And while these compositions are quite satisfactory for these purposes, the latter obviously only represent limited markets.

In an attempt to overcome the unexpected deficiencies observed when using these refractory compositions in the shaft of soda-lime glass furnaces, a research program on "ER.2161" was conducted to find the causes of the deficiencies in question, and to find a means of overcoming them. These investigations, carried out on ER.2161, have shown that two conversions are systematically encountered and that the deficiencies of the material only occur when these conversions exceed a certain level. These conversions are (a) the formation of zircon from the baddeleyite ($ZrO_2$) and the silica of the vitreous phase, and (b) the decrease in the proportion of $Na_2O$, which causes a quantitative and qualitative modification of the vitreous phase. The extent of these conversions depends on the temperature conditions to which the refractory block is subjected in service. The extent of these conversions seems to be greater the higher the temperature of the hot face of the block. Thus, the conversions are at a maximum for applications involving soda-lime glass, where the processing temperature is highest. This explains why the refractory material is not suitable for the shaft of a soda-lime glass furnace, but is very satisfactory in the necks of such furnaces and for borosilicate glass furnaces, the operating temperatures of which are lower.

The zircon formation has the appearance of a sheath around the nuclei of baddeleyite and takes place in a relatively large zone of the volume of the block spaced from the interface (i.e. the hot face) and having a thickness of a few centimeters (in the direction normal to the interface). It can happen that the smallest nuclei of baddeleyite are totally converted to zircon. At the interface itself, there is some penetration of alkaline constituents originating from the glass melt in the furnace. The zircon which encounters this alkaline zone decomposes into its constituents and precipitation of a multitude of small satellites of zirconia around the main nuclei of baddeleyite is observed. As the block becomes progressively worn, the zone in which there is conversion to zircon becomes displaced towards the back of the block. The formation of the zircon is accompanied by a reduction in volume of about 20%, which generates stresses. Furthermore, it causes a reduction in the proportion of silica in the vitreous phase, which leads to modification of its quality. At the interface, the process is reversed, the zircon dissociating with expansion in volume and regeneration of the vitreous phase.

The table below summarizes results from the analysis of used blocks (the analysis being of the zone with greatest conversion) by comparison with the analysis of a new block.

|  | NEW BLOCK | USED BLOCKS | | |
|---|---|---|---|---|
|  |  | Soda-lime glass | | Borosilicate glass |
|  |  | Block No. 1 | Block No. 2 |  |
| $Na_2O$ | 1.1% | 0.57% | 0.28% | 0.65% |
| Zircon | 0 | 15% | 10% | 6% |
| Vitreous phase | 20% | 12% | 11% | 16% |
|  |  |  | Poor corrosion resistance | Good corrosion resistance, in accordance with expectations and laboratory experiments |

In the zone adjacent to the zircon zone (with the exception of the interface), chemical analysis shows very low proportions of $Na_2O$ of less than 0.3%, instead of the original 1.1%. Investigations have shown that this reduction in the $Na_2O$ is due to the formation of sodium chromate from the chromium oxide and the $Na_2O$ present in the vitreous phase and from the volatilization, in service, of this sodium chromate by virtue of the porosity of the block. In fact, yellow deposits of sodium chromate have been observed on the external surfaces of the blocks, that is, on the cold surface, as a result of recondensation of the volatilized sodium chromate, which seems to take place below a certain temperature which can be placed at approximately 1,300° C. In fact, the vitreous phase of ER.2161, which represents about 20% of the total weight of the material, contains the $SiO_2$, the $Na_2O$, some $Al_2O_3$, some $ZrO_2$ and also a small amount of the total chromium oxide, the amount varying according to the state of oxidation of the refractory composition with the amount of chromium oxide present in the vitreous phase being smaller the greater the state of oxidation. Thus, the proportion (relative to the vitreous phase) ranges from about 4% of chromium oxide in the vitreous phase of an oxidized product to 8% and above for a less oxidized product. This is probably explained by the fact that the reduced forms of chromium oxide, such as CrO, are more soluble in the vitreous phase than chromic oxide, $Cr_2O_3$.

A first possible theoretical solution for preventing the formation of zircon is derived from the observation that the reaction leading to the formation of zircon is governed by the amount of alkali metal oxide present in the vitreous phase. The ratio $SiO_2/Na_2O$ would therefore be critical. By laboratory experiments, it has been shown that zircon is not formed when the weight ratio $SiO_2/Na_2O$ is less than or equal to 8. The other alkali metal oxides appear to act in the same way as $Na_2O$. On the other hand, alkaline earth metal oxides do not influence the reaction. To prevent the formation of zircon, it might therefore be considered sufficient to increase the amount of $Na_2O$ so that the ratio $SiO_2/Na_2O$ is less than or equal to 8. For a proportion of 14.5% of $SiO_2$, as in the case of ER.2161, this would correspond to a minimum proportion of $Na_2O$ of 1.75%. This theoretical solution is, however, illusory as long as the phenomenon of the reduction in the proportion of $Na_2O$ cannot be controlled. In fact, even if it is initially satisfactory, the ratio $SiO_2/Na_2O$ increases as the proportion of $Na_2O$ decreases and, after a certain time, reaches the value at which the formation of zircon starts.

It was therefore necessary to find a means of avoiding the phenomenon of the reduction in the proportion of $Na_2O$ in the vitreous phase, which, as indicated above, arises from the reaction of the chromium oxide present in the vitreous phase with the $Na_2O$ which is also present in the vitreous phase.

A possible method of solving the problem is therefore to reduce the amount of chromium oxide present in the vitreous phase, because there is a much higher probability that the reaction of the chromium oxide and the $Na_2O$ will take place in the vitreous phase, which is the only phase to contain both these constituents, rather than between the $Na_2O$ present in the vitreous phase and the crystalline chromium oxide.

Since with a decrease in the amount of chromium oxide present in the vitreous phase, the better the state of oxidation of the refractory composition, it might be thought possible to obtain the desired result by using improved oxidizing conditions. However, this comes up against practical difficulties because known oxidation techniques (long arc, blasting of oxygen) for cast refractory products based on oxides, do not enable the proportion of chromium oxide in the vitreous phase to be reduced reproducibly below 3 or 4%. This amount of chromium oxide in the vitreous phase still corresponds to a significant proportion of the normal $Na_2O$ content, which can therefore be volatilized by the formation of chromate.

We have now found a way of greatly reducing the proportion of chromium oxide dissolved in the vitreous phase which does not necessitate modifying conventional installations for making such compositions and which is simple and economical to carry out. By means of the invention, it is possible to obtain an improved refractory product which can be used for furnaces used to make soda-lime glass.

SUMMARY OF THE INVENTION

We have discovered that the desired refractory product can be obtained by adding to the conventional refractory material a suitable proportion of at least one oxide chosen from iron oxide and manganese oxide.

According to the present invention, therefore, there is provided a cast refractory composition which comprises, by weight and on an oxide basis:
1 to 75% of $Cr_2O_3$,
15 to 40% of $ZrO_2$,
3 to 76% of $Al_2O_3$,
7.5 to 20% of $SiO_2$,
0.4 to 2.5% of $Na_2O$, and
0.3 to 4.0% of at least one additional oxide selected from the group consisting of iron oxide and manganese oxide,
the $SiO_2/Na_2O$ ratio being from 5 to 15, and the $Na_2O$ being optionally at least partially replacable by a technically equivalent amount of at least one other alkali metal oxide, and the sum of the specified ingredients being at least 97% of the total composition.

By "a technically equivalent amount", it is meant a molarly equivalent amount.

Particularly preferred materials are those having a $SiO_2/Na_2O$ ratio in the range of from 8 to 12 and containing from 0.5 to 2% of iron oxide and/or manganese oxide, in particular iron oxide.

Although it is not wished to associate the present invention with any particular theoretical explanation of its mechanism, it appears that the beneficial effect of the addition of iron oxide results from a simple oxidation-reduction reaction of the type:

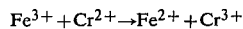

$$Fe^{3+} + Cr^{2+} \rightarrow Fe^{2+} + Cr^{3+}$$

An equation of a similar type can also be written for manganese oxide.

Thus, the iron oxide and/or manganese oxide ensure that the lower valency forms of chromium change to the valency III and, consequently, the solubility of chromium oxide in the vitreous phase is minimized, since it has been seen that the reduced forms of chromium oxide, such as CrO, are more soluble in the vitreous phase than chromic oxide, $Cr_2O_3$. The refractory material is not oxidized to a greater extent, but there is a simple substitution of a reduced form of chromium by a reduced form of iron or manganese.

It is advantageous to oxidize the refractory material as much as possible during its processing because the distribution of the iron between the phases: iron metal, vitreous phase and crystalline phase, varies with the oxidation-reduction state. Inadequate oxidation will lead to the formation of a predominance of iron metal, with no effect on the solubility of the chromium in the vitreous phase, since iron oxide is more easily reducible than chromium oxide.

Sufficient oxidation can be achieved by carrying out the melting of the starting materials under oxidizing conditions, using any of the known conventional processes for this purpose, for example melting in long arc conditions with simultaneous blasting of an oxidizing gas, such as oxygen, into the bath. For more details, reference may be made to U.S. Pat. No. 3,079,452 and French Pat. No. 2,103,779.

In general, the greater the state of oxidation of the refractory composition in the molten state, the smaller will be the amount of iron oxide and/or manganese oxide required, since the oxidation of the refractory composition maximizes the amount of iron oxide present in the vitreous phase. The presence of iron oxide and/or manganese oxide in the vitreous phase has two effects: firstly, it minimizes the formation of sodium chromate, which is the cause of the reduction in the $Na_2O$ present in the refractory material, and, secondly, it assists the diffusion of the $Na_2O$ originating from glass melt in the furnace into the refractory material, with the result that, during use, the vitreous phase of the refractory material no longer becomes poorer in $Na_2O$ but, on the contrary, becomes richer in $Na_2O$. This diffusion of the $Na_2O$ originating from the glass melt tends to lower the ratio $SiO_2/Na_2O$ to an equilibrium value corresponding to the absence of zircon. Thus, the value of the $SiO_2/Na_2O$ ratio in the starting composition is not of great importance as regards the formation of the zircon because this ratio will change in service until it reaches a value which avoids such formation. It therefore suffices to choose, for the starting composition, a value of the $SiO_2/Na_2O$ ratio which will give the best production efficiency. In French Pat. No. 2,183,604 mentioned above, the $SiO_2/Na_2O$ ratio had to be between 8 and 18 if the cast products were not to fracture. With the addition of FeO or MnO, it is necessary to adjust this ratio if it is desired to avoid the formation of splits or cracks during manufacture. It has thus been found that the $SiO_2/Na_2O$ ratio must be from 5 to 15 and preferably from 8 to 12.

The limiting proportions of iron oxide or manganese oxide which can be used are identical because the molecular weights of FeO and MnO are very similar (72 and 71 respectively). Below 0.3%, the additional oxide only has a slight effect on the solubility of the chromium oxide in the vitreous phase. Above 4% of additional oxide, the solubility of the chromium oxide in the vitreous phase is hardly affected any further and the refractory material tends to release stones in contact with soda-lime glass, probably as a result of a reduction in the viscosity of the aluminous interfacial layer by the iron oxide.

Industrially, the addition of iron oxide is economically preferable to the addition of manganese oxide because the former exists in the natural state in combination with chromium oxide in chromites. All or part of the iron oxide can therefore be provided by using a technical grade chromium oxide/chromite mixture. In this case, magnesia and, to a lesser extent, lime are also introduced into the composition. The magnesia introduced in this way is localised mainly in the vitreous phase and, when introduced in the maximum amount, leads to the formation of a very small amount of spinel, $(Mg,Fe)O.(Al,Cr,Fe)_2O_3$, without substantially influencing the behaviour of the refractory material in service.

Products containing up to 30% of $Cr_2O_3$ can be cast in conventional sand moulds and this contributes to achieving an economical cost. Products containing more than 30% of $Cr_2O_3$ must be cast in moulds with better refractory properties, for example graphite moulds.

The cast products are annealed using conventional annealing techniques as used in the manufacture of cast refractory products. In general, self-annealing in an insulating powder will be used. Thus, for products containing less than 30% of $Cr_2O_3$, kieselguhr or diatomaceous earth is perfectly suitable as an insulating powder. For products containing more than 30% of $Cr_2O_3$, it is necessary to use an insulating powder with better refractory properties, for example alumina, in order to prevent it from melting and sticking on contact with the moulding.

Suitable starting materials for making the products of the invention are the oxides forming part of the composition or precursors of such oxides. Thus, it is particularly advantageous from the economic point of view to use zircon ($ZrSiO_4$) as the source of $ZrO_2$ and $SiO_2$. The products of the invention prepared from zircon have a $ZrO_2/SiO_2$ weight ratio of approximately 2 and they constitute economically preferred products. The amount of zircon used may be from 22.5 to 60% and preferably from 33 to 45%, relative to the total composition. To obtain products having a $ZrO_2/SiO_2$ ratio of less than 2, it is sufficient, for example, to enrich the starting composition in $SiO_2$, for example by adding sand. On the other hand, products having a $ZrO_2/SiO_2$ ratio of more than 2 are economically less valuable because, in order to obtain them, it is necessary to add zirconia concentrates or pure zirconia to the zircon and this is less advantageous than the addition of further $Cr_2O_3$.

The refractory compositions of the invention are preferably used, for example in the form of blocks, for the lining of furnaces for the making of soda-lime glass. In this application, they have a greatly improved behaviour in comparison with the non-modified refractory products described in French Pat. No. 2,183,604 and U.S.

Pat. No. 3,837,870, as they are free from the long-term defects exhibited by the products of said patents. In particular, we have found that the proportion of $Na_2O$ in the vitreous phase of the compositions of the invention increases during their use instead of decreasing as in the case of the non-modified products. The corrosion resistance of the compositions of the invention is similar to that of the non-modified compositions (before the onset of their long-term defect). The compositions of the invention have an extremely fine and compact microstructure and do not release stones in service.

The products of the invention can, also, of course, be used for the lining of furnaces for the processing of other types of glass, such as borosilicate glasses or the like.

In order that the invention may be more fully understood, the following examples, in which all proportions are given in % by weight and on an oxide basis, are given by way of illustration only.

EXAMPLES 1 to 3

Three refractory compositions were prepared by melting batches having the chemical composition summarized in the table below. The material was melted in a long-arc electric furnace and oxygen was blasted into the molten mass in order to oxidize it. The molten material was cast in 200×200×350 mm sand moulds (Examples 1 and 2) or graphite moulds (Example 3) and the blocks were then annealed in an insulating powder as described above.

| Example | $Cr_2O_3$ | $Al_2O_3$ | $ZrO_2$ | $SiO_2$ | FeO (or MnO) | $Na_2O$ | $SiO_2/Na_2O$ |
|---|---|---|---|---|---|---|---|
| 1 | 12 | 43.5 | 28 | 14 | 1 | 1.5 | 9.3 |
| 2 | 28 | 30 | 26 | 13 | 1.5 | 1.5 | 8.7 |
| 3 | 60 | 13 | 15 | 7.5 | 4 | 0.5 | 15 |

EXAMPLES 4 to 6

In these examples, $T_1A$-grade Transvaal chromite having the following composition:
45.26% of $Cr_2O_3$,
24.60% of FeO,
2.15% of $SiO_2$,
14.45% of $Al_2O_3$,
11.35% of MgO,
0.50% of CaO,
0.60% of $TiO_2$, and
1.09% of various impurities,
was used as the source of FeO and of part of the $Cr_2O_3$. The remainder of the processing of the refractory compositions of Examples 4 to 6 was carried out in a similar manner to that described in connection with Examples 1 to 3. The table below summarizes the chemical compositions of the resulting products.

| Example | $Cr_2O_3$ | $Al_2O_3$ | $ZrO_2$ | $SiO_2$ | FeO | $Na_2O$ | MgO | $SiO_2/Na_2O$ |
|---|---|---|---|---|---|---|---|---|
| 4 | 12 | 42.9 | 28 | 14.1 | 1 | 1.5 | 0.5 | 9.4 |
| 5 | 28 | 29.3 | 26 | 13.1 | 1.5 | 1.5 | 0.6 | 8.7 |
| 6 | 60 | 10.8 | 15 | 7.8 | 4 | 0.6 | 1.8 | 13 |

These products have similar properties to those of Examples 1 to 3, but have the advantage of being more economical.

It will be apparent that the embodiments described are only examples and that it is possible to modify them, in particular by substituting technical equivalents, without departing from the scope of the invention.

We claim:

1. In a fused cast refractory composition which comprises, by weight and on an oxide basis:
   1 to 74% of $Cr_2O_3$,
   15 to 40% of $ZrO_2$,
   3 to 76% of $Al_2O_3$,
   7.5 to 20% of $SiO_2$, and
   a small amount of at least one alkali metal oxide,
   the improvement wherein said composition includes 0.3 to 4.0% of at least one additional oxide selected from the group consisting of iron oxide and manganese oxide, and wherein the sum of the specified ingredients is at least 97% of the total composition.

2. The fused cast refractory composition as set forth in claim 1 which includes 0.4 to 2.5% of $Na_2O$, and wherein the $SiO_2/Na_2O$ ratio is from 5 to 15.

3. The fused cast refractory composition as set forth in claim 2 wherein the $SiO_2/Na_2O$ ratio is between 8 and 12, and wherein 0.5 to 2% of said additional oxide is present.

4. The fused cast refractory composition as set forth in claim 1 wherein said additional oxide is iron oxide.

5. The fused cast refractory composition as set forth in claim 4 wherein said iron oxide derives from naturally-occurring chromite.

* * * * *